No. 762,350. PATENTED JUNE 14, 1904.
J. L. REHNSTROM.
HOSE COUPLING.
APPLICATION FILED MAY 16, 1903.
NO MODEL.

Witnesses:
H. J. Levis
L. Boulton.

Inventor;
John L. Rehnstrom
By C. D. Levis
Attorney.

No. 762,350. Patented June 14, 1904.

UNITED STATES PATENT OFFICE.

JOHN L. REHNSTROM, OF McKEESPORT, PENNSYLVANIA.

HOSE-COUPLING.

SPECIFICATION forming part of Letters Patent No. 762,350, dated June 14, 1904.

Application filed May 16, 1903. Serial No. 157,388. (No model.)

*To all whom it may concern:*

Be it known that I, JOHN L. REHNSTROM, a citizen of the United States, residing at McKeesport, in the county of Allegheny and State of Pennsylvania, have invented a new and useful Improvement in Hose-Couplings, of which improvement the following is a specification.

This invention relates to certain new and useful improvements in "hose-couplings," and has for its object the production of a cheap and efficient device whereby a perfect joint may be formed in an expeditious manner, and after the joint has been formed the same will be securely locked in place until such time as it is desired to disconnect the same.

With the above and other objects in view the invention will now be described in detail, reference being had to the accompanying drawings, forming a part of this specification, in which like reference-numerals designate like parts in the several views, in which—

Figure 1:
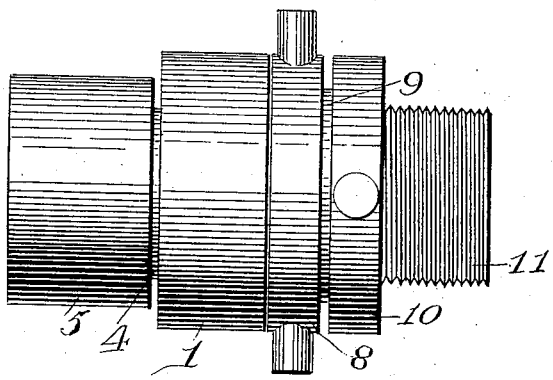
Figure 2:
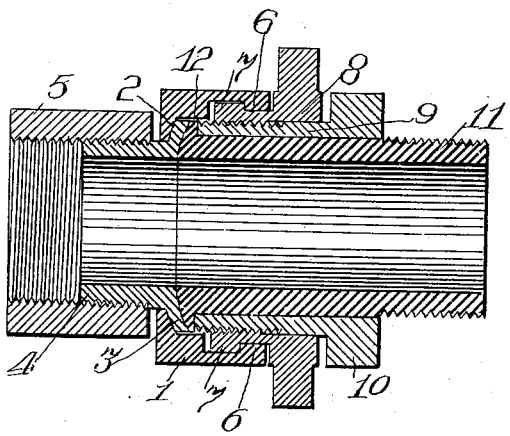
Figure 3:
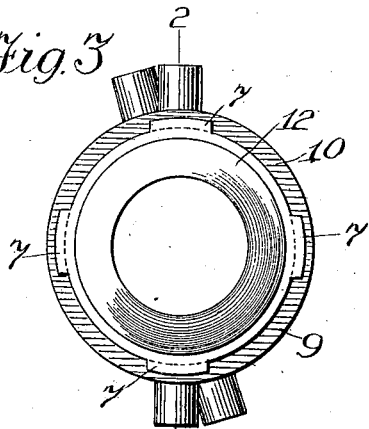
Figure 4:
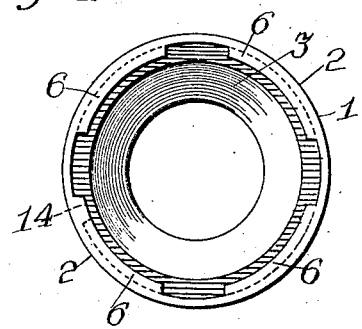

Figure 1 is a side elevation of my improved hose-coupler in its connected position. Fig. 2 is an elevation in section on the lines 2 2 of Fig. 3. Fig. 3 is a face view of the male portion, and Fig. 4 is a face view of the female portion.

In carrying out my invention I provide a female part (designated by the reference-numeral 1) which is provided with an aperture around which is formed the ledge 2, abutting against which is the shoulder 3 of the thimble 4, which on the outside of the end which projects through the female part 1 is screw-threaded, and a connecting-nipple 5 is connected therewith. The face of the female part 1 is provided with a plurality of lugs 6, the space between which permits the insertion of the lugs 7, mounted on or formed integral with the male member 8. This male member has provided on its periphery a plurality of bosses adapted to be engaged by the hand or by a spanner-wrench.

A portion of the interior base of the male member 8 is screw-threaded, and engaging with said thread is the threaded portion of a locking member 9, which also has provided on the periphery of the enlarged flange 10 a plurality of bosses adapted to be engaged by the hand or a spanner-wrench. Slidably mounted within this locking member is the thimble 11, the outside end of which is screw-threaded to form a means of securing the hose to the coupling and the inner end of which is provided with the enlarged portion 12, which abuts against the enlarged portion 3 of the thimble 4, secured to the inner side of one of the lugs 6. On the female part 1 is the lug 14, which forms a stop for any one of the lugs 2 on the male member 8 which may be in engagement with said lug.

The operation of the device is as follows: The two sections of hose being connected by any well-known means to the two thimbles 4 and 11, the male member 8, carrying with it the locking member 9 and the thimble 11, is inserted into the female member 1, carrying with it the thimble 4, and by rotating the male and female members relative to each other until one of the lugs 7 engages the lug 14 the two parts will be secured against pulling apart. To secure the same in this position and to form a perfectly-tight joint, the locking member 9 is then further rotated, the result of which will be to increase the distance between the enlarged portion 12 on the thimble 9 and the lugs 7 on the male member 8. The said enlarged portion 12, abutting against the enlarged portion 3 of the thimble 4, which is held in place by the ledge 2 of the female part 1, cannot be forced any farther, and consequently the lugs 7 on the male member 8 will be forced back against the inner surface of the lugs 6 of the female part 1, thereby securing the desired result.

In uncoupling this device the movements and results will be the opposite of those connected with coupling the same.

While I have described my invention in detail, it will be noted that various slight changes may be made in carrying out the same without departing from the general spirit thereof.

Having fully described my invention, what I desire to claim and secure by Letters Patent is—

A pipe-coupling comprising, in combination with the flanged meeting ends of pipes, a thimble having a flange at one end designed to engage the tapering flange in one of said pipe-sections, a cylindrically-outlined portion extending over the flanged meeting ends of the pipes, and an annular recess of larger diameter than the diameter of the portion surrounding said meeting ends, a threaded collar mounted upon one of the pipes, a coupling-ring having threaded connection with the circumference of said collar and provided with a flanged end 7 adapted to engage said annular recess, whereby the ends of the pipes may be securely held together, as set forth.

In testimony whereof I have hereunto signed my name in the presence of two subscribing witnesses.

JOHN L. REHNSTROM.

In presence of—
H. J. LEVIS,
F. O. HENZI.